UNITED STATES PATENT OFFICE.

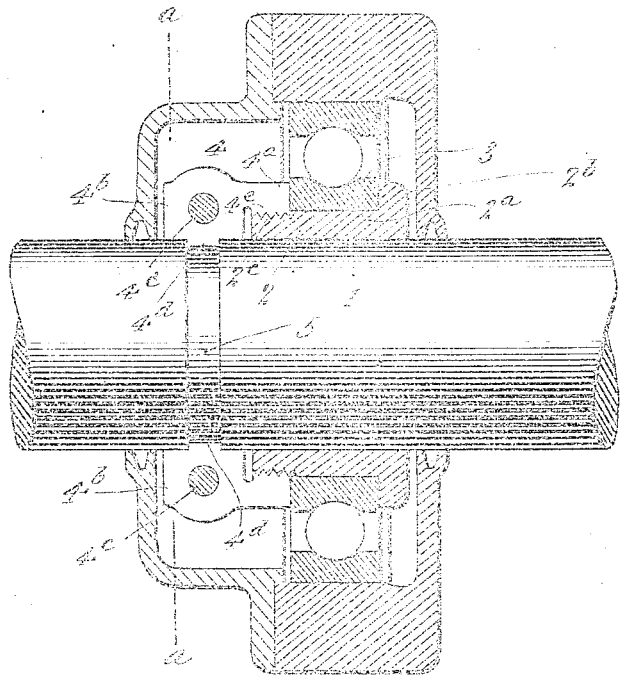

HENRY HESS, OF PHILADELPHIA, PENNSYLVANIA, ASSIGNOR TO THE HESS-BRIGHT MANUFACTURING COMPANY, OF PHILADELPHIA, PENNSYLVANIA, A CORPORATION OF DELAWARE.

CLAMPING DEVICE FOR ANTIFRICTION-BEARINGS.

1,167,758.     Specification of Letters Patent.     Patented Jan. 11, 1916.

Application filed November 21, 1910. Serial No. 593,450.

*To all whom it may concern:*

Be it known that I, HENRY HESS, a citizen of the United States, residing at Philadelphia, in the county of Philadelphia and State of Pennsylvania, have invented certain new and useful Improvements in Clamping Devices for Antifriction-Bearings, of which the following is a specification, reference being had therein to the accompanying drawing.

This invention relates to means for securing parts against endwise displacement on shafts, and is designed with special reference to fastening of anti-friction bearings on shafts in such manner that the bearing will be securely confined thereon and prevented from shifting or moving lengthwise of the shaft.

The invention consists broadly in a bushing adapted to surround the shaft and give support both radially and endwise to the member to be clamped, in combination with a clamping nut adapted to be interlocked with the shaft and interlocked also with the bushing, and arranged to engage the member to be secured, whereby the latter may be clamped on the bushing and the parts held on the shaft against displacement.

In the accompanying drawings: Figure 1 is a longitudinal sectional elevation showing my improved device applied and clamped to an anti-friction bearing on a shaft. Fig. 2 is a transverse sectional elevation on the line *a—a* of the preceding figure.

Referring to the drawings: 1 represents a shaft or support; 2 a bushing surrounding the same; 3 the inner casing member of an anti-friction bearing which surrounds the bushing and receives radial support therefrom by the circumferential bearing surface $2^a$, and endwise support by the radial shoulder $2^b$ on the end of the bushing; 4 represents a nut which is interlocked with the shaft so as to be held from movement lengthwise, and is interlocked also with the bushing, the nut being provided with an extension $4^a$ adapted to engage the casing member of the bearing and bind the same against the shoulder $2^b$.

The nut is in the present instance in two parts or half sections $4^b$—$4^b$ connected together by transverse connecting bolts $4^c$ so that it may be conveniently applied to the shaft, the same being interlocked with the shaft by means of inwardly extending ribs $4^d$ on the sections of the nut, adapted when the parts of the nut are applied so as to surround the shaft, to extend in a circumferential groove 5 in the shaft. By this means the nut will be held securely against movement lengthwise of the shaft. The extension $4^a$ on the nut is interlocked with the bushing by means of interior screw threads $4^e$ on the extension, which threads engage corresponding screw threads $2^c$ on the extended end of the bushing.

In using my improved device, the member to be clamped, in the present instance the inner casing member of an anti-friction bearing, is slipped over the bushing and seated against the end shoulder thereon, and the bushing is applied over the shaft adjacent the circumferential groove therein. The two parts of the nut are applied from opposite sides to the shaft so that the interior ribs will enter the groove in the shaft, and the interiorly threaded extension on the nut will engage the threaded end of the bushing. The connecting bolts for the two sections of the nut are then screwed up to draw the parts together fairly tight, and the nut is screwed up on the bushing. As a result of this action, the bushing will be drawn endwise within the nut, and the extension on the latter engaging the side of the casing member, the latter will be clamped and bound firmly between said extension and the end shoulder on the bushing. When the parts have been brought to the desired position, the bolts connecting the two parts of the nut are tightened up to hold the parts in their adjusted position.

By the construction shown and described, it will be observed that due to the interlocked engagement of the nut with the shaft, and due to the interlocked engagement of the nut with the bushing, the bearing clamped on the bushing will be securely and firmly held against displacement lengthwise of the shaft, and this without the necessity of threading the shaft or clamping side bushings or collars thereon.

In the foregoing specification and accompanying drawings, I have described and shown my improved clamping device in the form which I prefer to adopt and for the purpose of securing anti-friction bearings to their shafts or supports. It is manifest, however, that my invention is not limited to this particular use of the device, nor is it limited to the specific details shown, as the parts may be modified within the skill of the mechanic without departing from the spirit of the invention.

Having thus described my invention, what I claim is:—

1. In combination with a shaft, a bushing thereon provided with a supporting surface and with an annular bearing rib at the end of the supporting surface, a member supported by the bushing and adapted to bind against said bearing rib, and a clamping nut interlocked with the shaft and interlocked also with the bushing, said nut being adapted when turned, to shift the bushing endwise and clamp said member between the nut and bearing rib on the bushing.

2. In combination with a shaft provided with a groove, a bushing on the shaft having a supporting surface and provided with a threaded portion, a member supported by the bushing, and a nut surrounding the shaft and screwed onto the threaded portion of the bushing, said nut being formed with a rib engaging in the groove in the shaft and adapted when turned to shift the bushing endwise and bind the said member thereon.

3. In combination with a shaft provided with a groove, a bushing on the shaft having a supporting portion and provided with a shoulder, and having also a threaded portion, a member supported by the bushing and adapted to bear against said shoulder, and a nut provided with a rib engaging in the groove in the shaft, and having a threaded extension adapted to be screwed on the threaded portion of the bushing and to engage said member.

4. In combination with a shaft, a bushing thereon provided with a bearing shoulder, a member surrounding and supported by said bushing and adapted to bear against the shoulder thereon, and a clamping device interlocked with the shaft in such manner as to be held against endwise motion relative to the shaft, said clamping device being operatively connected with the bushing and being adapted, when turned, to shift the bushing endwise and also to engage said member in clamping the same against the bearing shoulder on the bushing.

5. In combination with a shaft, a bushing thereon provided with a supporting surface and with a bearing shoulder at the end of said surface, projecting laterally therefrom, a member supported by the bushing and adapted to bear at its end against the bearing shoulder, and a nut on the shaft engaging the bushing and acting when turned to shift the bushing endwise on the shaft and bind said shoulder forcibly against said member endwise.

6. In combination with a shaft, a bushing thereon having a supporting portion and provided with an annular bearing shoulder at the end of the supporting portion, a member supported by the bushing and adapted to bear against said shoulder, and an annular member surrounding and interlocked with the shaft and coöperating with the bushing when turned in shifting the same endwise on the shaft to cause its shoulder to bind against the supported member.

In testimony whereof I have affixed my signature in presence of two witnesses.

HENRY HESS.

Witnesses:
 NETTIE L. HAHN,
 THEO. H. M'CALLA.